United States Patent
Brevick

(10) Patent No.: US 11,434,986 B1
(45) Date of Patent: Sep. 6, 2022

(54) VARIABLE PITCH STATOR AND TWO HYDRAULIC PASSAGE CONTROL

(71) Applicant: Ford Global Technologies, LLC, Dearborn, MI (US)

(72) Inventor: John Edward Brevick, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/208,109

(22) Filed: Mar. 22, 2021

(51) Int. Cl.
*F16H 45/02* (2006.01)
*F16H 41/24* (2006.01)

(52) U.S. Cl.
CPC ............ *F16H 45/02* (2013.01); *F16H 41/24* (2013.01); *F16H 2045/021* (2013.01); *F16H 2045/0205* (2013.01); *F16H 2045/0215* (2013.01)

(58) Field of Classification Search
CPC ............. F16H 41/24; F16H 2045/0205; F16H 2045/0215; F16D 33/04
See application file for complete search history.

(56) References Cited

U.S. PATENT DOCUMENTS

| | | | |
|---|---|---|---|
| 7,066,312 B2 * | 6/2006 | Abe | F16H 45/02 192/3.29 |
| 9,784,353 B2 * | 10/2017 | Frait | F16H 61/56 |
| 10,520,072 B2 | 12/2019 | Vanni | |
| 10,895,311 B2 * | 1/2021 | Derhammer | F16D 25/0635 |
| 2019/0353235 A1 | 11/2019 | Derhammer et al. | |

FOREIGN PATENT DOCUMENTS

CN 106907454 6/2017

OTHER PUBLICATIONS

Heck, et al., Efficient Solutions for Automatic Transmissions—Torque Converters and Clutch Packs, Schaeffler Symposium, 2018, pp. 1-31.

* cited by examiner

*Primary Examiner* — Huan Le
(74) *Attorney, Agent, or Firm* — Burris Law, PLLC

(57) ABSTRACT

A vehicle driveline component includes a torque converter including an actuator and a clutch. The actuator includes an actuator piston slidable within an actuator chamber and dividing the actuator chamber into loosening and tightening chambers. The actuator piston moves the stator blades between a plurality of pitch positions. The clutch selectively couples the turbine to the impeller. The clutch includes a spring and clutch piston. The clutch piston at least partially defines an apply chamber and a release chamber. The apply chamber is in fluid communication with the tightening chamber via a hydrodynamic chamber. The release chamber is in fluid communication with the loosening chamber. The clutch piston is movable between an engaged position which inhibits relative rotation between the housing and the turbine and a disengaged position permitting relative rotation. The clutch spring is supported by the turbine hub and biases the clutch piston toward the disengaged position.

20 Claims, 6 Drawing Sheets

VARIABLE PITCH STATOR AND TWO HYDRAULIC PASSAGE CONTROL

FIELD

The present disclosure relates to an automotive transmission, and more particularly to a torque converter having a variable pitch stator and control thereof.

BACKGROUND

The statements in this section merely provide background information related to the present disclosure and may not constitute prior art.

A torque converter is a type of fluid coupling, which connects a power source, such as an internal combustion engine, to a load, such as an automatic transmission. The torque converter typically includes an impeller (also referred to as a pump) connected to a crankshaft of the engine, a turbine in a torus shape surrounding a transmission axis, and a stator.

The torque converter can increase torque when the output rotational speed is low by allowing the fluid coming off the curved vanes of the turbine to be deflected off the stator while it is held against its one-way clutch, thus providing the function of a reduction gear. The torque converter includes a bypass clutch to connect the crankshaft of the engine to the transmission when their speeds are nearly equal, to avoid slippage and a resulting loss of efficiency.

A variable-pitch stator has been used in the torque converter to improve performance and fuel economy. The angle of attack of the blades of the stator can be changed to change the amount of torque multiplication produced by the torque converter in response to changes in engine speed and load. At the normal angle of attack, the stator causes the converter to produce a moderate amount of multiplication but with a higher level of efficiency. If the driver abruptly opens the throttle, a valve can switch the stator pitch to a different angle of attack, increasing torque multiplication at the expense of efficiency.

A torque converter typically uses a four-passage system for controlling the bypass clutch and the pitch of the blades of the stator—two for independently controlling the engagement/disengagement of the bypass clutch and the other two for independently controlling the pitch of the blades of the stator. The four-passage system requires substantial modification to the turbine shaft, the stator shaft and/or the pump shaft, as well as additional seals associated with these passages, thereby complicating the structure of the torque converter and increasing the manufacturing costs.

Moreover, it is difficult to use a four-passage system in a small-sized torque converter where available space for the fluid passages is limited. Further, the typical variable pitch torque converter can allow for only two pitch control positions, i.e., a full tight position and a full loose position. Thus, while often referred to as being variable pitch torque converters, such typical torque converters would be more accurately described as being switch-pitch torque converters. An optimum performance of the torque converter cannot be achieved by using only two pitch positions.

The present disclosure addresses these and other issues associated with assembling hybrid modules with torque converters into transmission assemblies.

SUMMARY

This section provides a general summary of the disclosure and is not a comprehensive disclosure of its full scope or all of its features.

In one form, according to the teachings of the present disclosure, a vehicle driveline component includes a torque converter. The torque converter includes a housing, an impeller, a turbine shaft, a turbine hub, a turbine, a stator, an actuator, and a clutch. The housing is supported for rotation about an axis. The impeller is coupled to the housing for common rotation therewith about the axis. The turbine shaft is disposed about the axis. The turbine hub is disposed about a first end portion of the turbine shaft and coupled thereto for common rotation about the axis. The turbine is coupled to the turbine hub for common rotation about the axis. The stator includes a plurality of stator blades movable between a plurality of pitch positions. The actuator includes an actuator piston slidable within an actuator chamber and dividing the actuator chamber into a loosening chamber and a tightening chamber. The actuator piston is drivingly coupled to the stator blades to move the stator blades between the plurality of pitch positions. The clutch is configured to selectively couple the turbine to the impeller. The clutch includes a clutch spring, a clutch piston, and a friction material coupled to the clutch piston. The clutch piston at least partially defines an apply chamber and a release chamber. The apply chamber is coupled for fluid communication with a hydrodynamic chamber of the torque converter. The hydrodynamic chamber is coupled for fluid communication with the tightening chamber. The release chamber is coupled for fluid communication with the loosening chamber. The clutch piston is movable between an engaged position in which the friction material inhibits relative rotation between the housing and the turbine and a disengaged position in which the turbine rotates relative to the housing. The clutch spring is supported by the turbine hub and biases the clutch piston toward the disengaged position.

According to a variety of alternate forms: the clutch spring is a Belleville spring disposed about the turbine hub; the clutch includes a snap ring and the turbine hub defines a groove, the snap ring being received in the groove and inhibiting axial movement of the Belleville spring in an axial direction that is away from the clutch piston; the turbine hub includes a shoulder and a radially inward portion of the Belleville spring contacts the shoulder, the shoulder inhibiting axial movement of the radially inward portion of the Belleville spring in an axial direction that is away from the clutch piston; the turbine hub defines a plurality of first bores that provide fluid communication between the release chamber and the loosening chamber; the turbine shaft defines a central passageway open through an aperture in an axial end of the first end portion of the turbine shaft, the aperture providing fluid communication between the central passageway and the first bores; the first bores are open to an annular cavity that is radially between the turbine hub and the turbine shaft; the first bores extend at an angle relative to the axis such that the first bores extend from the annular cavity longitudinally in a direction that has an axial and radial component relative to the axis; the turbine shaft defines at least one second bore that extends through a sidewall of the turbine shaft to couple the loosening chamber to the central passageway for fluid communication therewith; the vehicle driveline component further includes a stator shaft disposed about the turbine shaft and a pump shaft disposed about the stator shaft and coupled to the pump for common rotation about the axis, the pump shaft and the stator shaft cooperating to define an annular passageway that couples the hydrodynamic chamber and the tightening chamber to a solenoid valve for fluid communication therewith; the actuator includes an actuator spring configured to bias the stator blades to a predetermined pitch position of the plurality of pitch positions; the predetermined pitch position is a full loose position and a spring rate of the actuator spring is configured to permit the actuator piston to be in a full tight position when a pressure in the apply chamber is greater than a full tight pressure, wherein a spring rate of the clutch spring is configured to permit the clutch piston to move from the disengaged position to the engaged position when a pressure in the apply chamber reaches an apply pressure and, wherein the apply pressure is greater than the full tight pressure; a range of pressures in the tightening chamber permitting movement between the full loose position and the full tight position is a low pressure regime, wherein the apply pressure is in a high pressure regime; the vehicle driveline component further includes a solenoid valve, the solenoid valve including a first inlet/outlet in fluid communication with the tightening chamber and a second inlet/outlet in fluid communication with the loosening chamber, wherein the solenoid valve is configured to operate in a first mode in which the solenoid controls a pressure differential between the first inlet/outlet and the second inlet/outlet within a first pressure range to adjust a position of the actuator piston between a full loose position, a full tight position, and a plurality of intermediate positions therebetween, wherein the solenoid valve is configured to operate in a second mode in which the solenoid valve permits the pressure differential between the first inlet/outlet and the second inlet/outlet to be within a second pressure range in which the actuator piston is in the full tight position and the clutch piston is in the disengaged position, wherein the solenoid is configured to operate in a third mode in which the solenoid valve permits the pressure differential between the first inlet/outlet and the second inlet/outlet to reach an apply pressure in which the clutch piston is in the engaged position, wherein the apply pressure is greater than the second pressure range; the actuator spring is configured such that the actuator piston is in the full loose position when a pressure in the tightening chamber is zero; the solenoid is configured to maintain the pressure differential at a plurality of intermediate pressures within the first pressure range.

In another form in accordance with the teachings of the present disclosure, a vehicle driveline component including a torque converter. The torque converter including a housing, an impeller, a turbine shaft, a turbine hub, a turbine, a stator, an actuator, and a clutch. The housing is supported for rotation about an axis. The impeller is coupled to the housing for common rotation therewith about the axis. The turbine shaft is disposed about the axis. The turbine hub is disposed about a first end portion of the turbine shaft and coupled thereto for common rotation about the axis. The turbine hub defines a plurality of first bores that extend through the turbine hub longitudinally at an angle relative to the axis. The turbine is coupled to the turbine hub for common rotation about the axis. The turbine hub defines a groove. The stator includes a plurality of stator blades movable between a plurality of pitch positions. The actuator includes an actuator piston slidable within an actuator chamber and dividing the actuator chamber into a loosening chamber and a tightening chamber. The actuator piston is drivingly coupled to the stator blades to move the stator blades between the plurality of pitch positions. The clutch is configured to selectively couple the turbine to the impeller. The clutch includes a Belleville spring, a snap ring, a clutch piston, and a friction material coupled to the clutch piston. The clutch piston at least partially defines an apply chamber and a release chamber. The apply chamber is coupled for fluid communication with a hydrodynamic chamber of the torque converter. The hydrodynamic chamber is coupled for fluid communication with the tightening chamber. The first bores couple the release chamber to the loosening chamber for fluid communication therebetween. The clutch piston is movable between an engaged position in which the friction material inhibits relative rotation between the housing and the turbine and a disengaged position in which the turbine rotates relative to the housing. The Belleville spring is disposed about the turbine hub and the snap ring is received in the groove of the turbine hub and inhibits axial movement of the Belleville spring in an axial direction that is away from the clutch piston. The Belleville spring biases the clutch piston toward the disengaged position.

According to a variety of alternate forms: the vehicle driveline component further includes a solenoid valve including a first inlet/outlet in fluid communication with the tightening chamber and a second inlet/outlet in fluid communication with the loosening chamber, wherein the solenoid valve is configured to operate in a first mode in which the solenoid controls a pressure differential between the first inlet/outlet and the second inlet/outlet within a first pressure range to adjust a position of the actuator piston between a full loose position, a full tight position, and a plurality of intermediate positions therebetween, wherein the solenoid valve is configured to operate in a second mode in which the solenoid valve permits the pressure differential between the first inlet/outlet and the second inlet/outlet to be within a second pressure range in which the actuator piston is in the full tight position and the clutch piston is in the disengaged position, wherein the solenoid is configured to operate in a third mode in which the solenoid valve permits the pressure differential between the first inlet/outlet and the second inlet/outlet to reach an apply pressure in which the clutch piston is in the engaged position, wherein the apply pressure is greater than the second pressure range; the turbine shaft defines a central passageway open through an aperture in an axial end of the first end portion of the turbine shaft, the aperture providing fluid communication between the central passageway and the first bores; the first bores are open to an annular cavity that is radially between the turbine hub and the turbine shaft.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
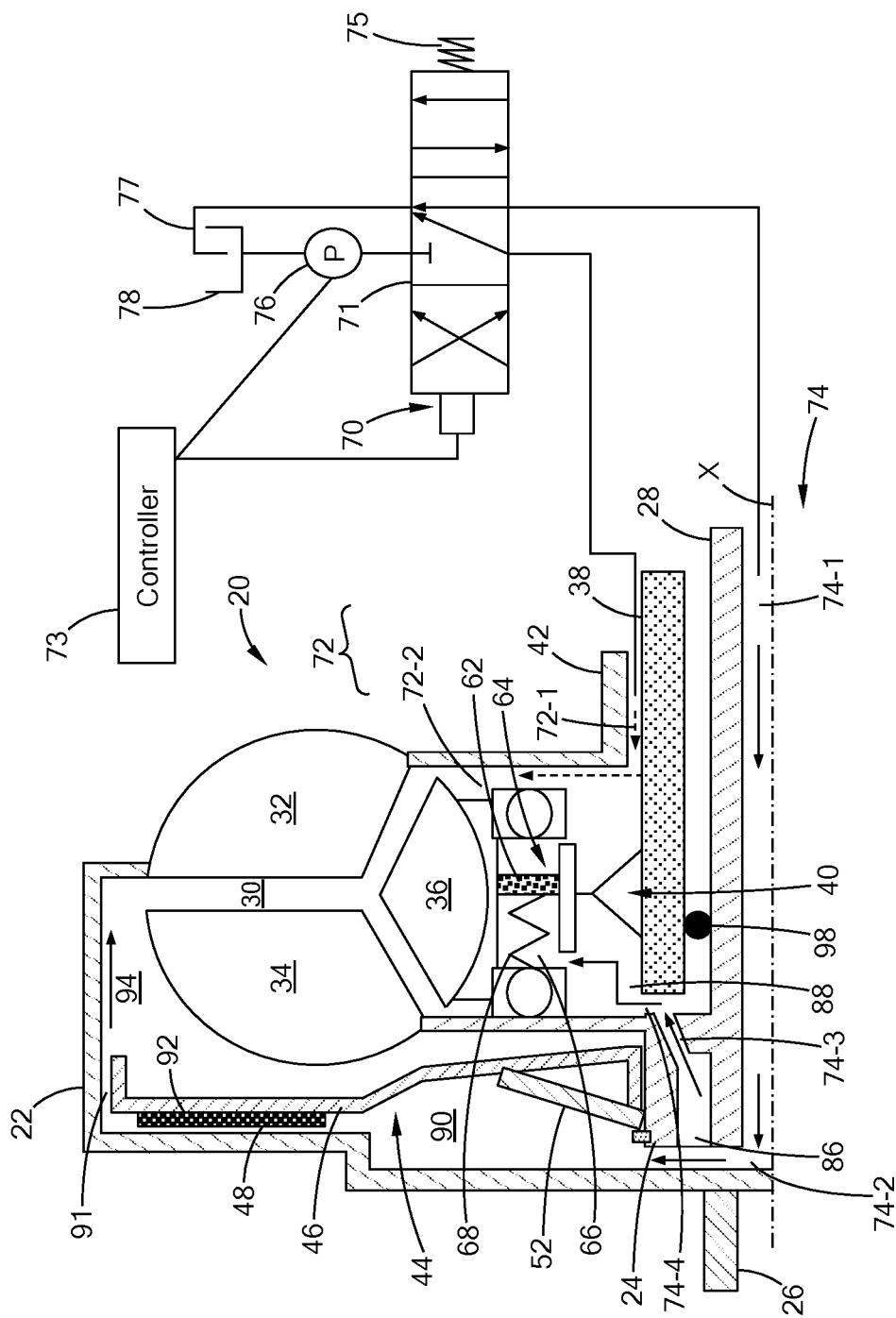
FIG. 1 is a schematic cross-sectional view of a torque converter constructed in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a torque converter 20 disposed about an axis X and constructed in accordance with teachings of the present disclosure includes a housing 22 fixed to a torque converter input shaft 26, an impeller 32 fixedly coupled to the housing 22 and rotatable with the torque converter input shaft 26, a turbine 34 fixedly coupled to a turbine hub 24, a stator 36 disposed between the impeller 32 and the turbine 34 for changing the fluid flow returning from the turbine 34 to the impeller 32.

The torque converter input shaft 26 is drivingly coupled to a crankshaft (not shown) of an internal combustion engine (not shown) to receive input torque therefrom. In one form, the torque converter input shaft 26 is fixedly coupled to the crankshaft for common rotation. The turbine hub 24 is fixedly mounted around an end of a turbine shaft 28, which supplies power to the transmission (not shown). The turbine 34 is disposed adjacent to the impeller 32 to define a hydrodynamic chamber 30 therebetween with the stator 36 being disposed in the hydrodynamic chamber 30. The impeller 32 is also fixedly coupled to a hollow pump shaft 42. The stator 36 is coupled to a hollow stator shaft 38. The turbine shaft 28 is coaxially disposed and rotatable within the stator shaft 38. The pump shaft 42 is coaxially and rotatably mounted around the hollow stator shaft 38.

The stator 36 is coupled to the stator shaft 38 by a one-way clutch 40. When the stator 36 receives torque in one rotational direction, the one-way clutch 40 is disengaged such that the stator 36 is freely rotatable relative to the stator shaft 38. When the stator 36 receives toque in the opposite rotational direction, the one-way clutch 40 is engaged and the stator 36 is held against rotation by the one-way clutch 40 by inhibiting rotation of the stator 36 relative to the stator shaft 38. The stator shaft 38 is fixed to a fixed component (not shown) such as a fixed shaft or a housing of the transmission and is stationary relative to the torque converter 20.

When the turbine shaft 28 is stationary or rotating slowly compared to the crankshaft, the stator 36 is held against rotation by the one-way clutch 40. Rotation of the impeller 32 forces fluid to move between the impeller 32, the turbine 34, and the stator 36. The fluid exerts a hydrodynamic torque on the turbine 34. The stator 36 provides a reaction force causing the torque on the turbine 34 to be greater than the torque on the impeller 32. When the speed of the turbine 34 approaches that of the impeller 32, fluid in the torus flows circumferentially around the centerline of the torque converter 20, causing the one-way clutch 40 to overrun such that the stator 36 can rotate relative to the one-way clutch 40, not impeding the fluid flow.

The torque converter 20 further includes a bypass clutch 44. The bypass clutch 44 includes an annular clutch piston 46, a friction material 48 disposed on the clutch piston 46 facing a portion of the housing 22, and a clutch spring 52. The clutch piston 46 is disposed about the turbine hub 24 and coupled to the turbine hub 24 for common rotation about the axis X while permitting axial translation relative to the turbine hub 24 between a disengaged position (shown in FIG. 1) and an engaged position in which the friction material 48 engages the housing 22 to inhibit relative rotation between the clutch piston 46 and the housing 22. Thus, engagement of the bypass clutch 44 inhibits relative rotation between the torque converter input shaft 26 and the turbine shaft 28. The clutch spring 52 biases the clutch piston 46 axially away from the housing 22 such that the bypass clutch 44 is disengaged by default. The clutch spring 52 may be a Belleville spring disposed about the turbine hub 24.

Figure 2:
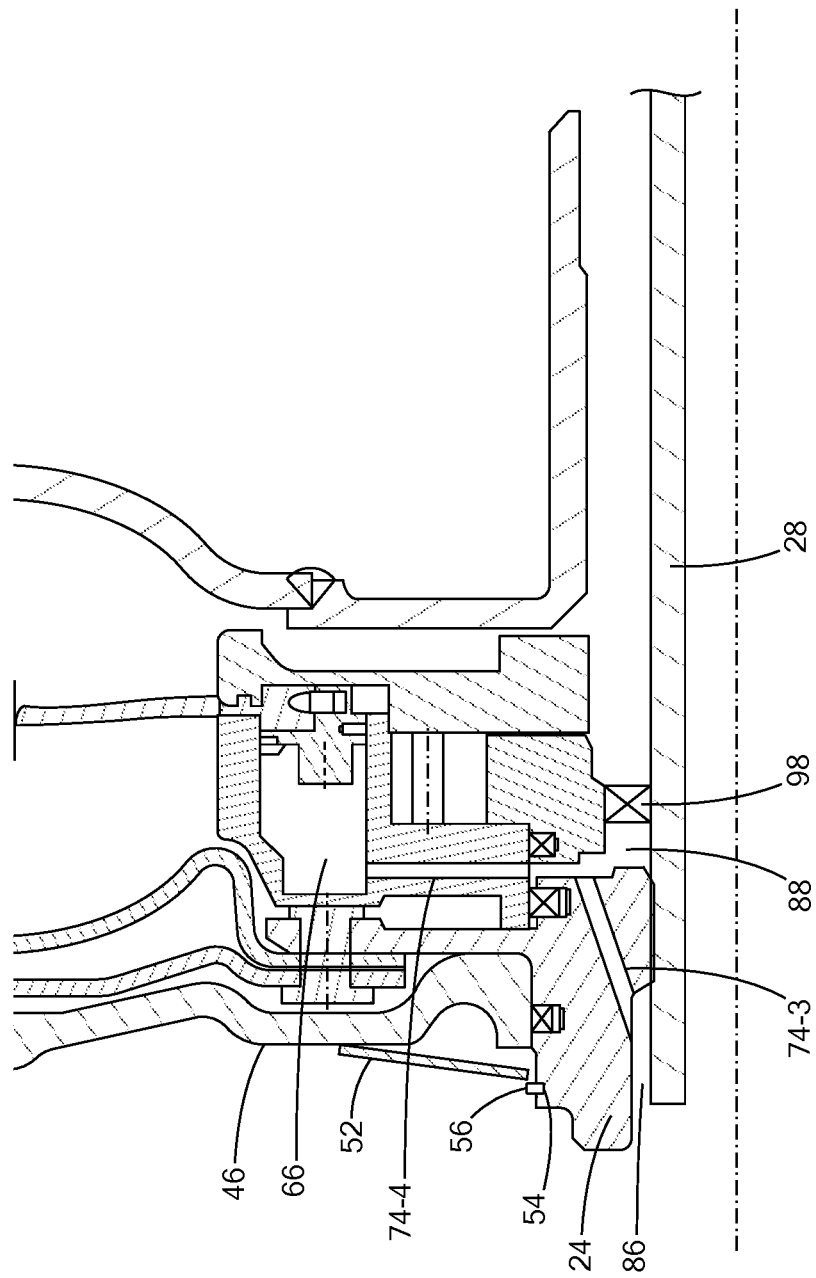
FIG. 2 is a schematic cross-sectional view of a portion of a torque converter constructed in accordance with the teachings of the present disclosure, showing a groove in a turbine hub and a snap ring received in the groove for inhibiting axial movement of a clutch spring.
Figure 3:
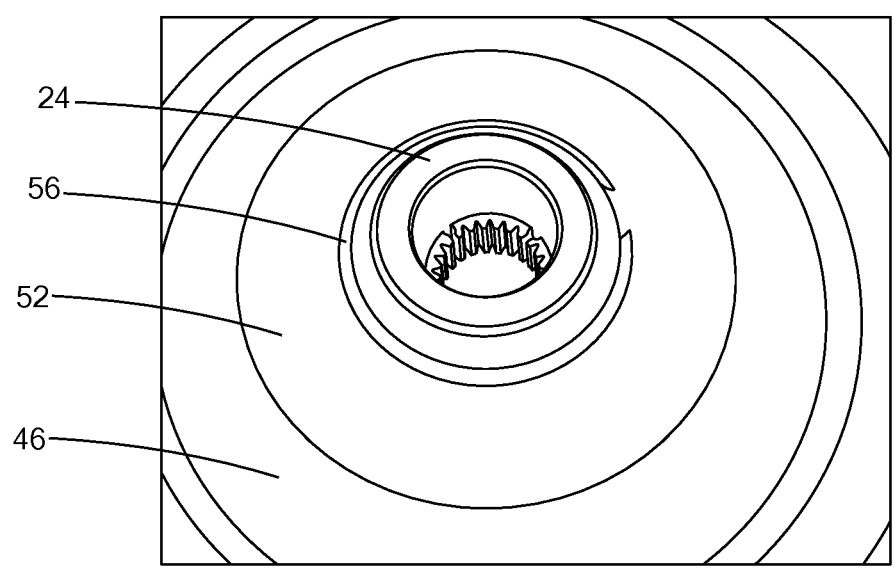
FIG. 3 is a perspective view of a turbine hub of a torque converter constructed in accordance with the teachings of the present disclosure.

Referring to FIGS. 2 and 3, the turbine hub 24 may define a groove 54 disposed forwardly (i.e., in the direction toward the engine) of the Belleville clutch spring 52. A snap ring 56 is received in the groove 54 to inhibit axial movement of the Belleville clutch spring 52 away from the clutch piston 46. By using the snap ring 56, the Belleville clutch spring 52 may be mounted to an existing turbine hub to bias the clutch piston 46 and the bypass clutch 44 in the disengaged position during a pitch control phase.

Figure 4:
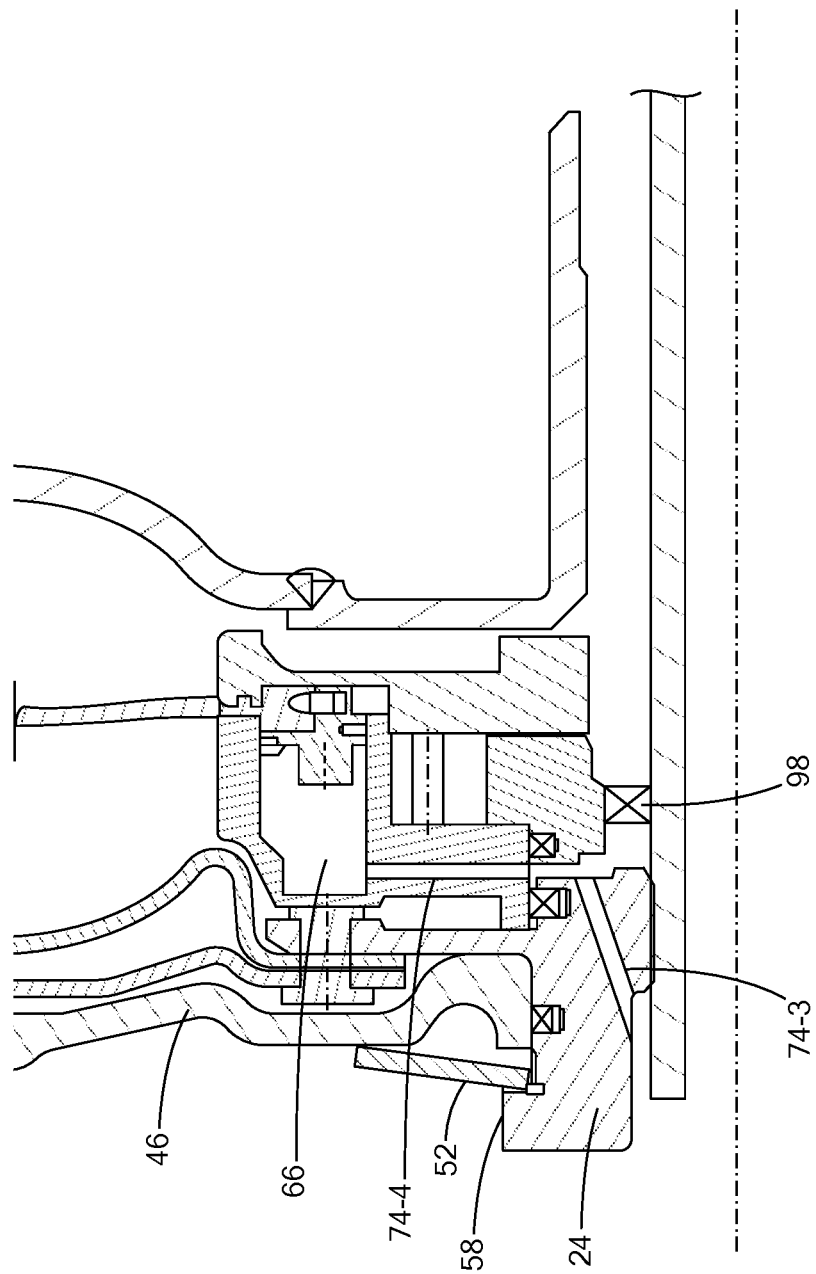
FIG. 4 is a schematic cross-sectional view of a portion of a torque converter constructed in accordance with the teachings of the present disclosure, showing a turbine hub including a shoulder for inhibiting axial movement of a clutch spring.

Referring to FIG. 4, alternatively, the turbine hub 24 may be formed to have a shoulder 58 to contact a central portion of the Belleville clutch spring 52 such that the shoulder 58 inhibits axial movement of the Belleville clutch spring 52 away from the clutch piston 46. The shoulder 58 can be formed on or connected to the hub 24 in any suitable manner. In one example, the shoulder 58 can be threaded onto the hub 24 via threads (not shown) on the shoulder 58 and mating threads (not shown) on the hub 24. In another example, the shoulder 58 can be welded onto the hub 58.

Referring back to FIG. 1, the clutch piston 46 partially defines and is disposed between an apply chamber 94 and a release chamber 90. The pressure difference between the apply chamber 94 and the release chamber 90 and the spring force of the clutch spring 52 have an effect on the axial position of the clutch piston 46, i.e., disengaged or engaged position. The bypass clutch 44 is disengaged by default and a first rotary power flow path is established from the impeller 32 to the transmission via the hydraulic coupling action between the impeller 32 and the turbine 34. When the pressure difference between the apply chamber 94 and the release chamber 90 is sufficient to overcome the biasing force of the clutch spring 52, the higher pressure in the apply chamber 94 pushes the clutch piston 46 against the biasing force of the clutch spring 52, causing the friction material 48 to engage the housing 22. When the bypass clutch 44 is engaged, the torque converter input shaft 26 is coupled the turbine shaft 28, thereby providing a second, mechanical power flow path from the engine to the transmission.

The torque capacity of the bypass clutch 44 is proportional to the force with which the friction material 48 is pressed against the housing 22. When the vehicle is cruising at moderate speeds, the power required is generally low and fuel efficiency is important. The bypass clutch 44 may be engaged during cruising to transmit the engine torque to the turbine shaft 28 with high efficiency. However, when the vehicle is operated at lower speeds with high gearbox speed ratios, the bypass clutch 44 may be disengaged to take advantage of the torsional vibration isolation and torque multiplication provided by the hydrodynamic power flow path of the torque converter. Therefore, torque converter efficiency is important when the vehicle is operated at lower speeds.

Power flow through the hydrodynamic power flow path is governed by the speed of impeller 32 and the speed of turbine 34. The relationship between the speeds and the torques is a complex function of torus geometry and of the blade angles of the impeller, turbine, and stator. At a constant turbine speed, both impeller torque and turbine torque increase as impeller speed increases.

A torque converter designed to exert a higher resistance torque on the impeller at a given impeller and turbine speed is called a stiffer or tighter converter, whereas a torque converter designed to exert a lower torque for the same impeller and turbine speed is called a looser converter. The stiffness of a torque converter may be expressed as a K-factor or capacity characteristic that relates the impeller torque to the impeller speed. A low K-factor indicates a tight converter while a high K-factor indicates a loose K-factor. The ratio of turbine torque to impeller torque generally increases as the ratio of impeller speed to turbine speed increases. However, based on conservation of power, the torque ratio is never greater than the speed ratio. The product of the speed ratio and the torque ratio is the converter efficiency, which varies between zero and one as a function of impeller speed and turbine speed. The torque ratio when the turbine is stationary is called the stall torque ratio. Torque converter design often involves compromises between achieving the desired stiffness, maximizing efficiency, and maximizing torque ratio. The most advantageous combination of properties differs for different vehicle operating conditions.

A loose torque converter is desirable when the vehicle is stopped to reduce load on the engine improving fuel economy and reduce vibrations at idle. A loose torque converter may also be desirable for turbocharged engines as it allows the turbochargers to spool up more quickly. A loose converter may also be desirable when a driver is requesting high power to quickly increase engine speed to a range capable of generating more power. Once the vehicle begins moving, a tighter torque converter may be desirable to reduce engine speeds. In a typical torque converter having a stator with fixed blades, a compromise K-factor is chosen to balance the competing goals of operating the engine at lower speeds where the engine is more efficient, i.e., a tighter state, and operating the engine at higher speeds where the engine produces more power, i.e., a looser state.

However, the characteristics (i.e., the K-factor and torque ratio) of a torque converter having a variable-pitch stator may be adjusted by modifying a pitch of the blades of the stator 36 to optimize the performance of the torque converter in different operating conditions. Generally, the torque converter becomes looser by closing the blades of the stator, i.e., reducing fluid flow through the stator, and becomes tighter by opening the blades of the stator i.e., increasing fluid flow through the stator.

As further shown in FIG. 1, the torque converter 20 further includes an annular pitch piston 62 disposed about the axis X and connected to the blades of the stator 36 such that the pitch of the blades depends on the axial position of the pitch piston 62. The position of the pitch piston 62, and thus the pitch of the blades of the stator 36, may be controlled based on operating conditions by a solenoid valve 70. The optimum torque converter characteristics differ among different operating conditions for a particular vehicle. By changing the angle, i.e., pitch, of the blades in the stator 36, the torque converter characteristics may be varied.

The stator 36 defines an annular piston chamber. The pitch piston 62 is received in the piston chamber and divides the piston chamber into a tightening chamber 64 and a loosening chamber 66. The pitch piston 62 is connected to a return spring 68 located in the loosening chamber 66 and is axially movable within the chamber to change the volume of the tightening chamber 64 and the loosening chamber 66. When the pitch piston 62 moves toward the loosing chamber 66, the pitch of the stator blades move to a position associated with a tighter characteristic. The volume of the loosening chamber 66 is reduced and the volume of the tightening chamber 64 is increased. In contrast, when the pitch piston 62 moves toward the tightening chamber 64, the pitch of the stator blades move to a position associated with a looser characteristic. The volume of the tightening chamber 64 is reduced, and the volume of the loosening chamber 66 is increased.

As further shown in FIG. 1, the torque converter 20 further includes a solenoid valve 70 for controlling the fluid flow in a first passage 72 and a second passage 74. The solenoid valve 70 is operable in a first mode (shown in FIG. 1) and a second mode. In the first mode, the solenoid valve 70 couples a pump 76 to the first passage 72 for fluid communication therewith and couples a return line 77 of a fluid reservoir 78 to the second passage 74 for fluid communication therewith. The pump 76 is in fluid communication with the reservoir 78 and configured to pump hydraulic fluid from the reservoir 78. In the second mode, the solenoid valve 70 couples the pump 76 to the second passage 74 for fluid communication therewith and couples the return line 77 to the first passage 72 for fluid communication therewith.

The tightening chamber 64 is in fluid communication with the first passage 72. The first passage 72 is in fluid communication with the hydrodynamic chamber 30. The hydrodynamic chamber 30 is in fluid communication with the apply chamber 94. The loosening chamber 66 is in fluid communication with the second passage 74. The second passage 74 is in fluid communication with the release chamber 90. A small bleed passage 91 exists between the clutch piston 46 and the housing 22 to permit a small amount of fluid to bleed between the release chamber 90 and the apply chamber 94 when the bypass clutch 44 is disengaged. The amount of fluid able to flow through the bleed passage 91 is considerably less than the pumping capacity of the pump 76 such that the pump is capable of increasing the pressure in the apply chamber 94 to move the clutch piston 46 to the engaged position.

Thus, first and second passages 72, 74 cooperate to form a two-path common hydraulic circuit. The first passage 72 and the second passage 74 and the solenoid valve 70 are used to control the position of the pitch piston 62 and engagement/disengagement of the bypass clutch 44 by changing the pressure of the fluid in the first and second passages 72, 74. The solenoid valve 70 is operated in different modes based on the solenoid pressure to selectively establish fluid communication between the pump 76 and the tightening chamber 64 via the first passage 72 and between the pump 76 and the loosening chamber 66 via the second passage 74.

The first passage 72 includes an annular passageway 72-1 defined between the stator shaft 38 and the pump shaft 42, a radial passageway 72-2 communicating between the annular passageway 72-1 and the hydrodynamic chamber 30. The annular passageway 72-1 is in fluid communication with the tightening chamber 64. Thus, in the first mode, the fluid can flow from the solenoid valve 70, through the annular passageway 72-1, the radial passageway 72-2, the hydrodynamic chamber 30, and into the apply chamber 94 and also from the annular passageway 72-1 to the tightening chamber 64. In the second mode, fluid can flow from the apply chamber 94 and the tightening chamber 64 in the reverse direction back to the solenoid valve 70 and can return to the reservoir 78 via the return line 77.

The second passage 74 includes a central axial passageway 74-1 in the turbine shaft 28 along the axis X, a radial passageway 74-2 adjacent to an end of the turbine hub 24, a set of first bores or orifices 74-3 formed at an angle through the turbine hub 24, and a radial passageway 74-4 adjacent to an end of the stator shaft 38 and the turbine hub 24. While only one is illustrated, the number of the first bores 74-3 may be any suitable number. In one form, four first bores 74-3 are disposed equally spaced about the axis X but any number can be used without departing from the scope of the present disclosure. The first bores 74-3 extend at an angle relative to the axis X that is not perpendicular to the axis X. In other words, the first bores 74-3 can extend longitudinally in a direction that has an axial and radial component relative to the axis X. The first bores 74-3 can extend through the turbine hub 24 from an annular chamber 86 defined radially between the turbine shaft 28 to an annular chamber 88 on an opposite axial side of the turbine hub 24 that can be radially between the turbine shaft 28 and the loosening chamber 66. The first bores 74-3 establish fluid communication between the release chamber 90 and the space adjacent to the loosening chamber 66, thereby enabling the pressure in the second passage 74 to reach the loosening chamber 66. In the second mode, fluid can flow from the solenoid valve 70, through the axial passageway 74-1, and the radial passageway 74-2, into a release chamber 90 and also from the radial passageway 74-2, through the first bores 74-3, through the radial passageway 74-4, into the loosening chamber 66. In the first mode, fluid can flow from the release chamber 90 and the loosening chamber 66 in the reverse direction back to the solenoid valve 70 and can return to the reservoir 78 via the return line 77. In the example provided, there is a splined connection between the turbine hub 24 and the turbine shaft 28 but no seal therebetween. A seal 98 is disposed between the turbine shaft 28 and the stator shaft 38.

In the example provided, the solenoid valve 70 has a valve body 71 that is in a first position when the solenoid valve 70 is in the first mode, a second position when the solenoid valve 70 is in the second mode, and a third position when the solenoid valve 70 is operated in a third mode. In the first position, shown in FIG. 1, the valve body 71 permits free flow from the first passage 72 to the return line 77 and from the second passage 74 to the return line 77. In this first position, the valve body 71 can inhibit fluid communication between the pump 76 and the first and second passages 72, 74 or can connect the pump 76 back to the reservoir 78 to simply cycle fluid therein. In the second position, the valve body 71 permits free flow from the pump 76 to the first passage 72 and from the second passage 74 to the return line 77. In the third mode, the valve body 71 permits free flow from the pump 76 to the second passage 74 and from the first passage 72 to the return line 77. The solenoid valve 70 may also be operated in intermediate modes in which the valve body 71 is in intermediate positions between the first and second positions or between the first and third positions to adjust pressure in the first and second passages 72 and 74 by controlling the amount of flow permitted through the valve body 71.

A controller 73 is in communication with the solenoid valve 70 to control operation thereof and may also be in communication with the pump 76 to control operation of the pump 76. The valve body 71 can be biased toward the first position, such as by a spring 75, and the controller 73 can control the position of the valve body 71, and thus the pressures in the first and second passages 72 and 74, by adjusting the electrical current supplied to the solenoid valve 70 to overcome the spring 75.

Figure 5:
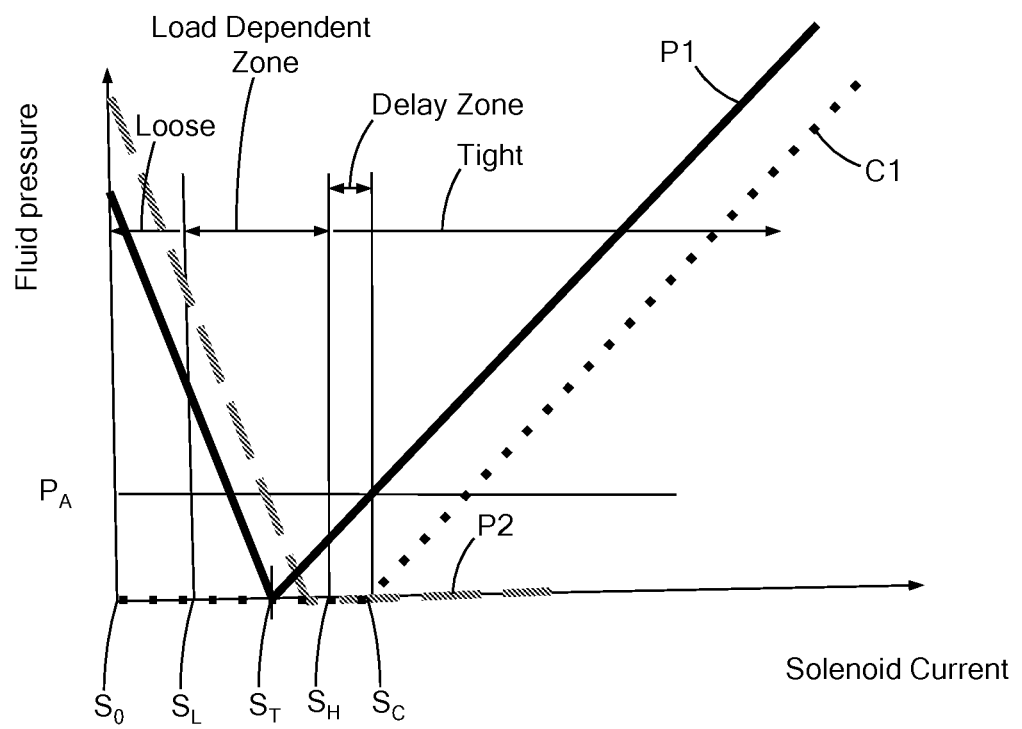
FIG. 5 is a graph illustrating the fluid pressures in the first and second passages of the torque converter of FIG. 1 and a torque capacity of the torque converter in relation to the solenoid operating current.

Referring to FIGS. 1 and 5, the pressure in the second passage 74, which is fluidly coupled to the release chamber 90 and the loosening chamber 66, follows the curve P2 as it relates to the current supplied to the solenoid valve 70. The pressure in the first passage 72, which is fluidly coupled to the apply chamber 94 and the tightening chamber 64 follows the curve P1 as it relates to the electrical current supplied by the solenoid valve 70.

The solenoid valve 70 can be operated in the third mode such that pressure is supplied to the second passage 74. Due to the pressure drop through the bleed passage 91, the pressure P2 is greater than that of P1. From this condition, at $S_O$, the solenoid current can start at zero and the clutch spring 52 holds the clutch piston 46 to the release position while the pressure P2 in the second passage 74 holds the pitch piston 62 to the full loose position. As the solenoid current increases, both pressures decrease at the same rate until a threshold current $S_T$ is reached. Beyond the threshold, the valve body 71 starts to be in a position in which the pump 76 increases the pressure P1 in the first passage 72 as the solenoid current increases.

The pressure balance on the pitch piston 62 is such that hydrodynamic forces hold the stator pitch at the loosest position when the solenoid current is below $S_L$. The return spring 68 is configured such that the stator pitch moves away from the loosest position for solenoid currents above $S_L$. As the solenoid current increases beyond $S_L$, the pitch piston 62 continues to move toward the tighter position. At the solenoid current $S_H$, the pitch piston 62 is in the full tight position. The range of solenoid currents between $S_L$ and $S_H$ is called the load dependent region.

As the solenoid current increases beyond $S_H$, there is a region called the delay zone between $S_H$ and a solenoid current $S_C$ in which the pressure begins to overcome the clutch spring 52 and starts to engage the bypass clutch 44. The amount of torque transferred through the bypass clutch 44 is indicated by curve C1. In the delay zone, the pressure P1 continues to increase while the pitch remains full tight and the clutch remains disengaged.

Accordingly, when the solenoid valve 70 is operated with a current S in a first current range ($0 < S < S_L$), the valve body 71 is at the first position to allow fluid to drain from the first passage 72 and the second passage 74 to the reservoir 78. In this range, the fluid pressure P1 in the first passage 72 reduces at a rate such that the pressure differential between P1 and P2 remains insufficient to overcome the clutch spring 52. Therefore, the bypass clutch 44 remains disengaged. Since the second passage 74 is in fluid communication with the loosening chamber 66 and the first passage 72 is in fluid communication with the tightening chamber 64, the pressure of the tightening chamber 64 is P1 and the pressure of the loosening chamber 66 is P2. In this solenoid current range, the pressure differential between P1 and P2 is insufficient to overcome the return spring 68 and the pitch piston 62 remains in the full loose position.

As the solenoid current continues to increase above $S_L$, the pressure P2 in the second passage 74 continues to decrease. The decreased pressure P2 in the second passage 74 becomes insufficient to maintain the pitch piston 62 in the full loose position. The returning force of the return spring 68 then causes the pitch piston 62 to move slightly away from the full loose position.

As the solenoid current gradually increases in the second pressure range ($S_L$<S<$S_H$), the valve body 71 is now moved toward the second position to be operated in the second mode where fluid communication is allowed between pump 76 and the first passage 72. In the second pressure range, the fluid pressure P2 in the second passage 74 gradually decreases to zero and stays zero as fluid continues to drain from the second passage 74 to the reservoir 78, whereas the pressure P1 in the first passage 72 continues to gradually decrease to zero and then, at solenoid current $S_T$, gradually increases as the valve body 71 starts directing more fluid from the pump 76 to the first passage 72 than from the first passage 72 to the return line 77. In this second solenoid current range, the position of the pitch piston 62 is controlled by the pressure differential between the first passage 72 and the second passage 74, and the biasing/returning force of the return spring 68. The pressures in this range are considered low pressures. The return spring 68 is such that the pressure balance on the pitch piston 62 from hydrodynamic forces may be controlled by controlling the solenoid current to control the stator pitch to be positions between the loosest position and the tightest position for some engine torques and speed ratios. This is called a load dependent region. The bypass clutch 44 remains disengaged in this load dependent region.

In the third solenoid current range ($S_H$<S<$S_C$), as the solenoid current continues to increase, the valve body 71 is moved to the third position and the solenoid valve 70 is operated in the third mode where the fluid flows freely from the pump 76 to the first passage 72 and fluid continues to drain from the second passage 74 to the return line 77. Pressure P1 at solenoid current $S_H$ is sufficient to position the pitch piston 62 in the full tight position. Pressure P1 in the first passage 72 continues to gradually increase as the solenoid current increases above $S_H$ while the pressure P2 remains zero. In this solenoid current range, also referred to as the delay zone, the pressure P1 is insufficient to overcome the clutch spring 52.

When the pressure P1 in the first passage 72 reaches an apply pressure $P_A$, at solenoid current $S_C$, the pressure differential between the apply chamber 94 and the release chamber 90 also reaches the apply pressure $P_A$. The apply pressure in the apply chamber 94 overcomes the biasing force of the clutch spring 52, thereby causing the bypass clutch 44 to engage. The pressure P1 in the first passage 72 also maintains the pitch piston 62 in the full tight position.

The clutch spring 52 and the return spring 68 are configured such that the clutch spring 52 is substantially stiffer than the return spring 68 and thus the pressure required to stroke the clutch piston 50 is substantially higher than the pressure required to stroke the pitch piston 62. Thus, the lower pressures used to actuate the blades of the stator are insufficient to cause the bypass clutch 44 to engage. Moreover, the return spring 68 is configured to have a spring rate such that the pitch piston 62 can be moved to a full tight position when the pressure in the apply chamber 94 is less than the apply pressure. Therefore, the pitch piston 62 is moved to a full tight position before the bypass clutch 44 is moved from the disengaged position to the engaged position. The controller can adjust the electrical current supplied to the solenoid valve 70 within the load dependent range $S_L$ to $S_H$ to fine tune the pitch of the stator blades.

As the pressure P1 in the first passage 72 continues to increase after the apply pressure $P_A$ is reached at solenoid current $S_C$, the pressure P1 in the apply chamber 94 causes the friction material 48 to be more firmly pressed against the housing 22. Increasing the pressure P1 beyond this point $S_C$ also increases clutch torque capacity. The clutch capacity is shown in dotted line as C1 and is proportional to the pressure P1 in the first passage 72.

Figure 6:
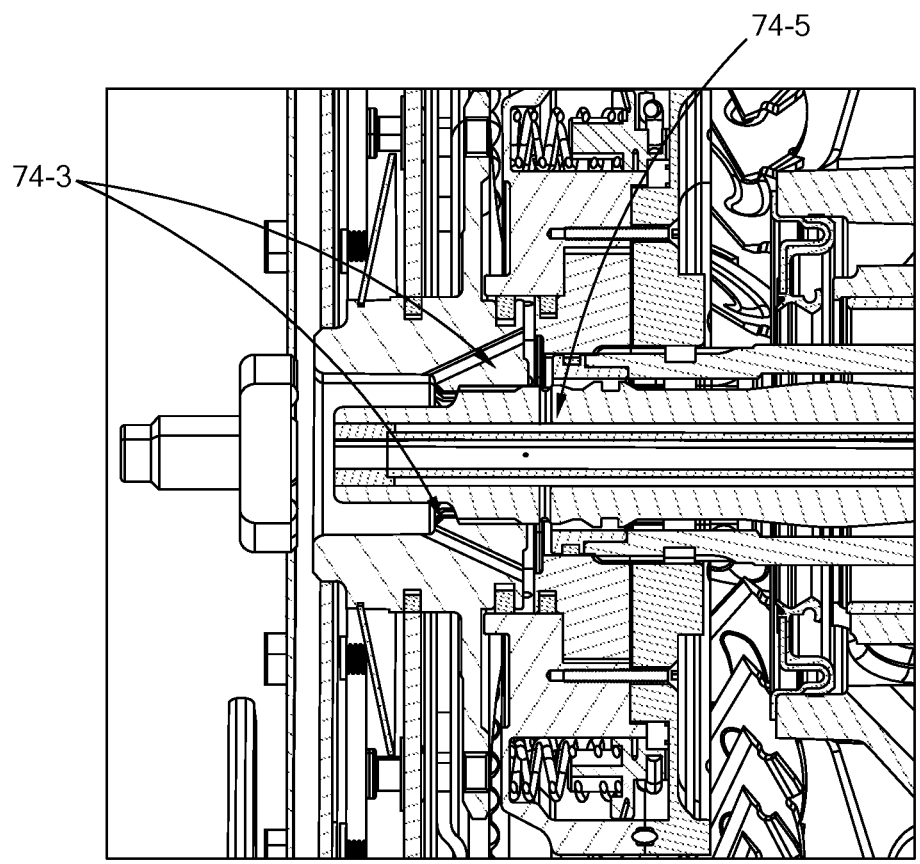
FIG. 6 is a partial cross-sectional view of a portion of a variant of a torque converter constructed in accordance with the teachings of the present disclosure.

Referring to FIG. 6, in another configuration, in addition to the set of first bores 73-1, a radial passageway 74-5 through the turbine shaft 28 can provide additional fluid communication between the loosening chamber 66 and the second passage 74.

The torque converter in accordance with the teachings of the present disclosure uses only two hydraulic circuits or passages and a single solenoid valve to control the position of the pitch piston and the engagement/disengagement of the bypass clutch by varying the pressures in the first and second passages and by operating the solenoid valve at different solenoid current levels. The solenoid valve selectively establishes fluid communication between a pump, a return line to a reservoir, the first passage, and the second passage. Therefore, the two-passage system allows the torque converter to control the engagement/disengagement of the bypass clutch and the position of the pitch piston without requiring significant modification to the existing turbine shaft, stator shaft, thereby reducing manufacturing costs.

Moreover, the two-passage system can be easily incorporated into a small-sized torque converter where space is limited. Further, the torque converter allows the pitch piston to move to the full loose position, full tight position, and a plurality of intermediate positions, making it truly variable pitch, as opposed to a typical torque converter where the pitch piston can be moved to only two positions, i.e., full tight or full loose.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle driveline component comprising:
 a torque converter including:
  a housing supported for rotation about an axis;
  an impeller coupled to the housing for common rotation therewith about the axis;
  a turbine shaft disposed about the axis;
  a turbine hub disposed about a first end portion of the turbine shaft and coupled thereto for common rotation about the axis;

a turbine coupled to the turbine hub for common rotation about the axis;

a stator including a plurality of stator blades movable between a plurality of pitch positions;

an actuator including an actuator piston slidable within an actuator chamber and dividing the actuator chamber into a loosening chamber and a tightening chamber, the actuator piston being drivingly coupled to the stator blades to move the stator blades between the plurality of pitch positions; and a clutch configured to selectively couple the turbine to the impeller, the clutch including a clutch spring, a clutch piston, and a friction material coupled to the clutch piston, the clutch piston at least partially defining an apply chamber and a release chamber, the apply chamber being coupled for fluid communication with a hydrodynamic chamber of the torque converter, the hydrodynamic chamber being coupled for fluid communication with the tightening chamber, wherein the release chamber is coupled for fluid communication with the loosening chamber, wherein the clutch piston is movable between an engaged position in which the friction material inhibits relative rotation between the housing and the turbine and a disengaged position in which the turbine rotates relative to the housing, wherein the clutch spring is supported by the turbine hub and biases the clutch piston toward the disengaged position, wherein the turbine hub defines a plurality of first bores that provide fluid communication between the release chamber and the loosening chamber.

2. The vehicle driveline component according to claim 1, wherein the turbine shaft defines a central passageway open through an aperture in an axial end of the first end portion of the turbine shaft, the aperture providing fluid communication between the central passageway and the first bores.

3. The vehicle driveline component according to claim 2 wherein the turbine shaft defines at least one second bore that extends through a sidewall of the turbine shaft to couple the loosening chamber to the central passageway for fluid communication therewith.

4. The vehicle driveline component according to claim 1, wherein the first bores are open to an annular cavity that is radially between the turbine hub and the turbine shaft.

5. The vehicle driveline component according to claim 4, wherein the first bores extend at an angle relative to the axis such that the first bores extend from the annular cavity longitudinally in a direction that has an axial and radial component relative to the axis.

6. A vehicle driveline component comprising:

a torque converter including:

a housing supported for rotation about an axis;

an impeller coupled to the housing for common rotation therewith about the axis;

a turbine shaft disposed about the axis;

a turbine hub disposed about a first end portion of the turbine shaft and coupled thereto for common rotation about the axis;

a turbine coupled to the turbine hub for common rotation about the axis;

a stator including a plurality of stator blades movable between a plurality of pitch positions;

an actuator including an actuator piston slidable within an actuator chamber and dividing the actuator chamber into a loosening chamber and a tightening chamber, the actuator piston being drivingly coupled to the stator blades to move the stator blades between the plurality of pitch positions;

a clutch configured to selectively couple the turbine to the impeller, the clutch including a clutch spring, a clutch piston, and a friction material coupled to the clutch piston, the clutch piston at least partially defining an apply chamber and a release chamber, the apply chamber being coupled for fluid communication with a hydrodynamic chamber of the torque converter, the hydrodynamic chamber being coupled for fluid communication with the tightening chamber, wherein the release chamber is coupled for fluid communication with the loosening chamber, wherein the clutch piston is movable between an engaged position in which the friction material inhibits relative rotation between the housing and the turbine and a disengaged position in which the turbine rotates relative to the housing, wherein the clutch spring is supported by the turbine hub and biases the clutch piston toward the disengaged position;

a stator shaft disposed about the turbine shaft; and a pump shaft disposed about the stator shaft and coupled to the impeller for common rotation about the axis, the pump shaft and the stator shaft cooperating to define an annular passageway that couples the hydrodynamic chamber and the tightening chamber to a solenoid valve for fluid communication therewith.

7. The vehicle driveline component according to claim 6, further comprising an actuator spring and the solenoid valve, wherein the actuator spring is configured to bias the stator blades to a predetermined pitch position of the plurality of pitch positions, wherein the solenoid valve includes a first inlet/outlet in fluid communication with the tightening chamber and a second inlet/outlet in fluid communication with the loosening chamber, wherein the solenoid valve is configured to operate in a first mode in which the solenoid valve controls a pressure differential between the first inlet/outlet and the second inlet/outlet within a first pressure range to adjust a position of the actuator piston between a full loose position, a full tight position, and a plurality of intermediate positions therebetween, wherein the solenoid valve is configured to operate in a second mode in which the solenoid valve permits the pressure differential between the first inlet/outlet and the second inlet/outlet to be within a second pressure range in which the actuator piston is in the full tight position and the clutch piston is in the disengaged position, wherein the solenoid valve is configured to operate in a third mode in which the solenoid valve permits the pressure differential between the first inlet/outlet and the second inlet/outlet to reach an apply pressure in which the clutch piston is in the engaged position, wherein the apply pressure is greater than the second pressure range.

8. The vehicle driveline component according to claim 7, wherein the actuator spring is configured such that the actuator piston is in the full loose position when a pressure in the tightening chamber is zero.

9. The vehicle driveline component according to claim 7, wherein the solenoid valve is configured to maintain the pressure differential at a plurality of intermediate pressures within the first pressure range.

10. A vehicle driveline component comprising:

a torque converter including:

a housing supported for rotation about an axis;

an impeller coupled to the housing for common rotation therewith about the axis;

a turbine shaft disposed about the axis;

a turbine hub disposed about a first end portion of the turbine shaft and coupled thereto for common rotation about the axis;

a turbine coupled to the turbine hub for common rotation about the axis;

a stator including a plurality of stator blades movable between a plurality of pitch positions;

an actuator including an actuator piston slidable within an actuator chamber and dividing the actuator chamber into a loosening chamber and a tightening chamber, the actuator piston being drivingly coupled to the stator blades to move the stator blades between the plurality of pitch positions; and a clutch configured to selectively couple the turbine to the impeller, the clutch including a clutch spring, a clutch piston, and a friction material coupled to the clutch piston, the clutch piston at least partially defining an apply chamber and a release chamber, the apply chamber being coupled for fluid communication with a hydrodynamic chamber of the torque converter, the hydrodynamic chamber being coupled for fluid communication with the tightening chamber, wherein the release chamber is coupled for fluid communication with the loosening chamber, wherein the clutch piston is movable between an engaged position in which the friction material inhibits relative rotation between the housing and the turbine and a disengaged position in which the turbine rotates relative to the housing, wherein the clutch spring is supported by the turbine hub and biases the clutch piston toward the disengaged position, wherein the actuator includes an actuator spring configured to bias the stator blades to a predetermined pitch position of the plurality of pitch positions, wherein the predetermined pitch position is a full loose position and a spring rate of the actuator spring is configured to permit the actuator piston to be in a full tight position when a pressure in the apply chamber is greater than a full tight pressure, wherein a spring rate of the clutch spring is configured to permit the clutch piston to move from the disengaged position to the engaged position when a pressure in the apply chamber reaches an apply pressure and, wherein the apply pressure is greater than the full tight pressure.

11. The vehicle driveline component according to claim 10, wherein the clutch spring is a Belleville spring disposed about the turbine hub, wherein the clutch includes a snap ring and the turbine hub defines a groove, the snap ring being received in the groove and inhibiting axial movement of the Belleville spring in an axial direction that is away from the clutch piston.

12. The vehicle driveline component according to claim 10, wherein the clutch spring is a Belleville spring disposed about the turbine hub, wherein the hub includes a shoulder and a radially inward portion of the Belleville spring contacts the shoulder, the shoulder inhibiting axial movement of the radially inward portion of the Belleville spring in an axial direction that is away from the clutch piston.

13. The vehicle driveline component according to claim 10, wherein a range of pressures in the tightening chamber permitting movement between the full loose position and the full tight position is a low pressure regime, wherein the apply pressure is in a high pressure regime.

14. The vehicle driveline component according to claim 10 further comprising a solenoid valve, the solenoid valve including a first inlet/outlet in fluid communication with the tightening chamber and a second inlet/outlet in fluid communication with the loosening chamber, wherein the solenoid valve is configured to operate in a first mode in which the solenoid valve controls a pressure differential between the first inlet/outlet and the second inlet/outlet within a first pressure range to adjust a position of the actuator piston between the full loose position, the full tight position, and a plurality of intermediate positions therebetween, wherein the solenoid valve is configured to operate in a second mode in which the solenoid valve permits the pressure differential between the first inlet/outlet and the second inlet/outlet to be within a second pressure range in which the actuator piston is in the full tight position and the clutch piston is in the disengaged position, wherein the solenoid valve is configured to operate in a third mode in which the solenoid valve permits the pressure differential between the first inlet/outlet and the second inlet/outlet to reach the apply pressure in which the clutch piston is in the engaged position, wherein the apply pressure is greater than the second pressure range.

15. The vehicle driveline component according to claim 14, wherein the actuator spring is configured such that the actuator piston is in the full loose position when a pressure in the tightening chamber is zero.

16. The vehicle driveline component according to claim 14, wherein the solenoid valve is configured to maintain the pressure differential at a plurality of intermediate pressures within the first pressure range.

17. A vehicle driveline component comprising:
a torque converter including:
a housing supported for rotation about an axis;
an impeller coupled to the housing for common rotation therewith about the axis;
a turbine shaft disposed about the axis;
a turbine hub disposed about a first end portion of the turbine shaft and coupled thereto for common rotation about the axis, the turbine hub defines a plurality of first bores that extend through the turbine hub longitudinally at an angle relative to the axis;
a turbine coupled to the turbine hub for common rotation about the axis, the turbine hub defining a groove;
a stator including a plurality of stator blades movable between a plurality of pitch positions;
an actuator including an actuator piston slidable within an actuator chamber and dividing the actuator chamber into a loosening chamber and a tightening chamber, the actuator piston being drivingly coupled to the stator blades to move the stator blades between the plurality of pitch positions; and
a clutch configured to selectively couple the turbine to the impeller, the clutch including a Belleville spring, a snap ring, a clutch piston, and a friction material coupled to the clutch piston, the clutch piston at least partially defining an apply chamber and a release chamber, the apply chamber being coupled for fluid communication with a hydrodynamic chamber of the torque converter, the hydrodynamic chamber being coupled for fluid communication with the tightening chamber, wherein the first bores couple the release chamber to the loosening chamber for fluid communication therebetween, wherein the clutch piston is movable between an engaged position in which the friction material inhibits relative rotation between the housing and the turbine and a disengaged position in which the turbine rotates relative to the housing, wherein the Belleville spring is disposed about the turbine hub and the snap ring is received in the groove of the turbine hub and inhibits axial movement of the Belleville spring in an axial direction that is away from the clutch piston, the Belleville spring biasing the clutch piston toward the disengaged position.

18. The vehicle driveline component according to claim 17 further comprising a solenoid valve including a first inlet/outlet in fluid communication with the tightening chamber and a second inlet/outlet in fluid communication with the loosening chamber, wherein the solenoid valve is configured to operate in a first mode in which the solenoid valve controls a pressure differential between the first inlet/outlet and the second inlet/outlet within a first pressure range to adjust a position of the actuator piston between a full loose position, a full tight position, and a plurality of intermediate positions therebetween, wherein the solenoid valve is configured to operate in a second mode in which the solenoid valve permits the pressure differential between the first inlet/outlet and the second inlet/outlet to be within a second pressure range in which the actuator piston is in the full tight position and the clutch piston is in the disengaged position, wherein the solenoid valve is configured to operate in a third mode in which the solenoid valve permits the pressure differential between the first inlet/outlet and the second inlet/outlet to reach an apply pressure in which the clutch piston is in the engaged position, wherein the apply pressure is greater than the second pressure range.

19. The vehicle driveline component according to claim 17, wherein the turbine shaft defines a central passageway open through an aperture in an axial end of the first end portion of the turbine shaft, the aperture providing fluid communication between the central passageway and the first bores.

20. The vehicle driveline component according to claim 19, wherein the first bores are open to an annular cavity that is radially between the turbine hub and the turbine shaft.

* * * * *